(12) United States Patent
Acuna et al.

(10) Patent No.: US 7,958,514 B2
(45) Date of Patent: Jun. 7, 2011

(54) APPARATUS, SYSTEM, AND METHOD FOR MANAGING TRAY DEVICES

(75) Inventors: Jorge D. Acuna, Vail, AZ (US); Linda Benhase, Tucson, AZ (US); John D. Lauer, Tucson, AZ (US); Duikaruna C. Soepangkat, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 11/764,124

(22) Filed: Jun. 15, 2007

(65) Prior Publication Data

US 2008/0313657 A1 Dec. 18, 2008

(51) Int. Cl.
*G06F 13/00* (2006.01)
(52) U.S. Cl. .................. 719/316; 707/999.103
(58) Field of Classification Search .................. 719/316; 707/999.103
See application file for complete search history.

(56) References Cited

U.S. PATENT DOCUMENTS

| | | | |
|---|---|---|---|
| 2004/0024854 A1 | 2/2004 | Mandal | 709/223 |
| 2004/0025142 A1 | 2/2004 | Mandal et al. | 717/104 |
| 2004/0068733 A1 | 4/2004 | Longbardi | 719/316 |
| 2005/0027850 A1* | 2/2005 | Menzies et al. | 709/223 |
| 2006/0106863 A1 | 5/2006 | Ramasamy Venkatraj et al. | 707/103 |
| 2008/0098321 A1* | 4/2008 | Krithivas | 715/771 |

* cited by examiner

*Primary Examiner* — Andy Ho
(74) *Attorney, Agent, or Firm* — Kunzler Needham Massey & Thorpe (57) ABSTRACT

An apparatus, system, and method are disclosed for managing tray devices. A tray slot module creates a tray slot object of a tray slot class that extends a SMI-S CIM CIM_Slot class. The tray slot object describes a tray slot. A tray physical package module creates a tray physical package object of a tray physical package class that extends a SIM-S CIM CIM_PhysicalPackage class. The tray physical package object describes a tray device, references the tray slot object, and comprises a universal unique identifier. A tray object module creates a tray object of a tray class that extends SMI-S CIM CIM_LogicalDevice class. The tray object describes a tray, is referenced by a SMI-S CIM CIM_ComputerSystem object, references the tray physical package object, and comprises a device identifier. A management module manages the tray device using the tray slot object, tray physical package object, and tray object.

20 Claims, 6 Drawing Sheets

APPARATUS, SYSTEM, AND METHOD FOR MANAGING TRAY DEVICES

BACKGROUND OF THE INVENTION

1. Field of the Invention

This invention relates to tray devices and more particularly relates to managing tray device.

2. Description of the Related Art

A data processing system may employ one or more device trays, referred to herein as trays. The trays may mount tray devices such as hard disk drives, processors, and the like. A tray may allow a tray device to communicate with the data processing system through a connector. The tray may also provide power, cooling, and the like for the tray device.

The tray may allow an administrator to easily add tray devices to or remove tray devices from the data processing system. For example, the administrator may remove a first hard disk drive from the tray and replace the first hard disk drive with a second hard disk drive.

Data processing systems are often heterogeneous environments, with hardware components and software from many suppliers working together. As a result, standards have been developed to coordinate interoperability between hardware and software components from different suppliers.

For example, the Storage Networking Industry Association's Storage Management Initiative (SMI) was created to develop and standardize interoperable storage management technologies for the storage, networking and end user communities. The Storage Networking Industry Association published a SMI specification (SMI-S) that includes a Common Information Model (CIM). The CIM defines software classes that can be used to create objects that facilitate communications between disparate hardware and software components.

Unfortunately, SMI-S CIM does not include classes for objects that manage trays. As a result, vendors often must employ ad hoc solutions to manage trays in data processing systems.

SUMMARY OF THE INVENTION

From the foregoing discussion, there is a need for an apparatus, system, and method that manage device trays. Beneficially, such an apparatus, system, and method would support managing device trays in a heterogeneous environment.

The present invention has been developed in response to the present state of the art, and in particular, in response to the problems and needs in the art that have not yet been fully solved by currently available tray management methods. Accordingly, the present invention has been developed to provide an apparatus, system, and method for managing a tray device that overcome many or all of the above-discussed shortcomings in the art.

The apparatus to manage a tray device is provided with a plurality of modules configured to functionally execute the steps of creating a tray slot object, creating a tray physical package object, creating a tray object, and managing a tray device. These modules in the described embodiments include a tray slot module, a tray physical package module, a tray object module, and a management module. The apparatus may further include a connectors on tray module, a realizes tray module, and a tray system device module.

The tray slot module creates a tray slot object of a tray slot class. The tray slot class extends a Storage Management Initiative specification (SMI-S) Common Information Model (CIM) CIM_Slot class. The tray slot object describes a tray slot and comprises a slot number.

The tray physical package module creates a tray physical package object of a tray physical package class. The tray physical package class extends a SIM-S CIM CIM_PhysicalPackage class. The tray physical package object describes a tray device. In addition, the tray physical package object references the tray slot object and comprises a universal unique identifier.

The tray object module creates a tray object of a tray class. The tray class extends a SMI-S CIM CIM_LogicalDevice class. The tray object of a tray class describes a tray. The tray object of the tray class is referenced by a SMI-S CIM CIM_ComputerSystem object, references the tray physical package object, and comprises a device identifier. The management module manages the device trays using the tray slot object, tray physical package object, and tray object.

A system of the present invention is also presented to manage a tray device. The system may be embodied in a data processing system. In particular, the system, in one embodiment, includes a tray and a computer.

The tray receives a storage device. In an embodiment, the storage device is a hard disk drive. The hard disk drive may be hot swappable.

The computer includes a processor and a memory. The processor and the memory of the computer execute computer readable programs. The computer readable programs comprise a tray slot module, a tray physical package module, a tray object module, and a management module. The computer readable programs may further include a connectors on tray module, a realizes tray module, and a tray system device module.

The tray slot module creates a tray slot object of a tray slot class. The tray slot class extends a SMI-S CIM CIM_Slot class. In addition, the tray slot object describes a tray slot and comprises a slot number.

The tray physical package module creates a tray physical package object of a tray physical package class. The tray physical package class extends a SIM-S CIM CIM_PhysicalPackage class. The tray physical package object describes a tray device. In addition, the tray physical package object references the tray slot object and comprises a universal unique identifier.

The tray object module creates a tray object of a tray class. The tray class extends a SMI-S CIM CIM_LogicalDevice class. The tray object describes a tray. In addition, the tray object is referenced by a SMI-S CIM CIM_ComputerSystem object, references the tray physical package object, and comprises a device identifier. The management module manages the device trays using the tray slot object, tray physical package object, and tray object.

A method of the present invention is also presented for managing a tray device. The method in the disclosed embodiments substantially includes the steps to carry out the functions presented above with respect to the operation of the described apparatus and system. In one embodiment, the method includes creating a tray slot object, creating a tray physical package object, creating a tray object, and managing a tray device. The method also may include creating a connectors on tray object, creating a realizes tray object, and creating a tray system device object.

A tray slot module creates a tray slot object of a tray slot class. The tray slot class extends a SMI-S CIM CIM_Slot class. In addition, the tray slot object describes a tray slot and comprises a slot number.

A tray physical package module creates a tray physical package object of a tray physical package class. The tray physical package class extends a SIM-S CIM CIM_PhysicalPackage class. The tray physical package object describes a tray device. In addition, the tray physical package object references the tray slot object and comprises a universal unique identifier.

A tray object module creates a tray object of a tray class. The tray class extends a SMI-S CIM CIM_LogicalDevice class. The tray object describes a tray. The tray object is referenced by a SMI-S CIM CIM_ComputerSystem object, references the tray physical package object, and comprises a device identifier. A management module manages the device trays using the tray slot object, tray physical package object, and tray object.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention creates objects for managing a tray device. The objects are of classes that may extend SMI-S CIM classes. The present invention manages tray devices using the created objects. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGAs), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
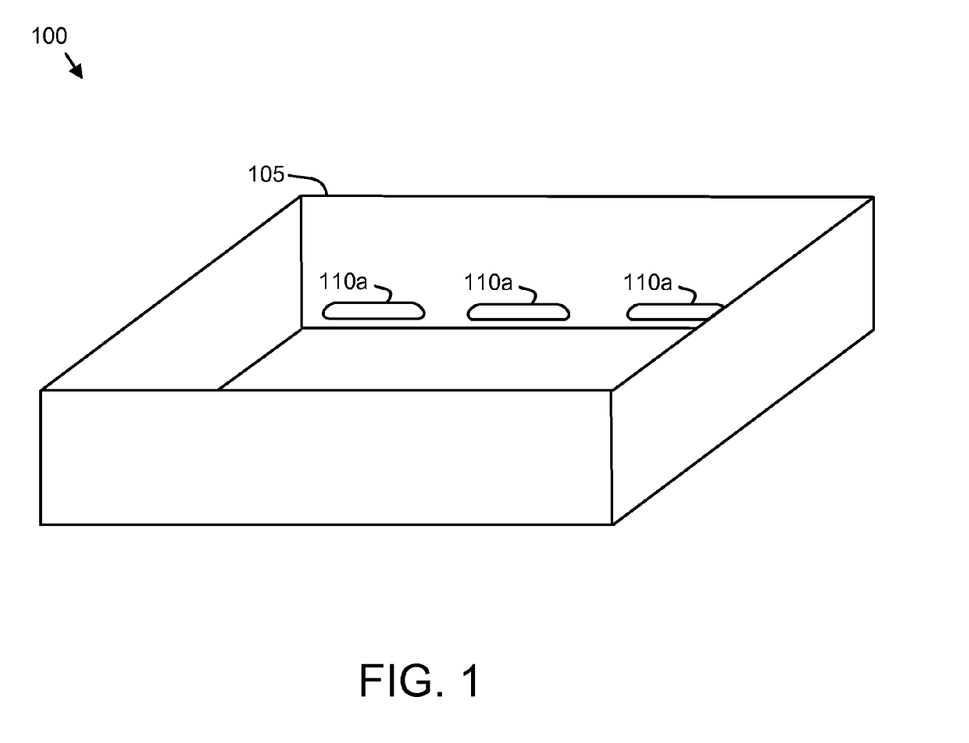
FIG. 1 is a schematic block diagram illustrating one embodiment of a tray in accordance with the present invention.

FIG. 1 is a schematic block diagram illustrating one embodiment of a tray 100 in accordance with the present invention. The tray 100 includes an enclosure 105 and plurality of tray connectors 110(a-c). Although, for simplicity only one (1) enclosure 105 and three (3) tray connectors 110 are shown, any number of enclosures 105 and tray connectors 110 may be used in the tray 100.

The tray 100 may mount tray devices. In addition, the tray 100 may allow an administrator to easily add the tray devices to and/or remove the tray devices from a data processing system. For example, the administrator may remove a first processor from the tray 100 and replace the first processor with a second processor. The tray 100 may also allow the tray device to communicate with a data processing system through the tray connectors 110. Each tray connector 110 may embody a slot for mounting tray devices.

The tray connectors 110 may mount tray devices. For example, the first tray connector 110a may include forty-four (44) pins for mounting a hard disk drive tray device, the second tray connector 110b may mount a processor, and the third slot 110c may mount another hard disc drive.

Figure 2:
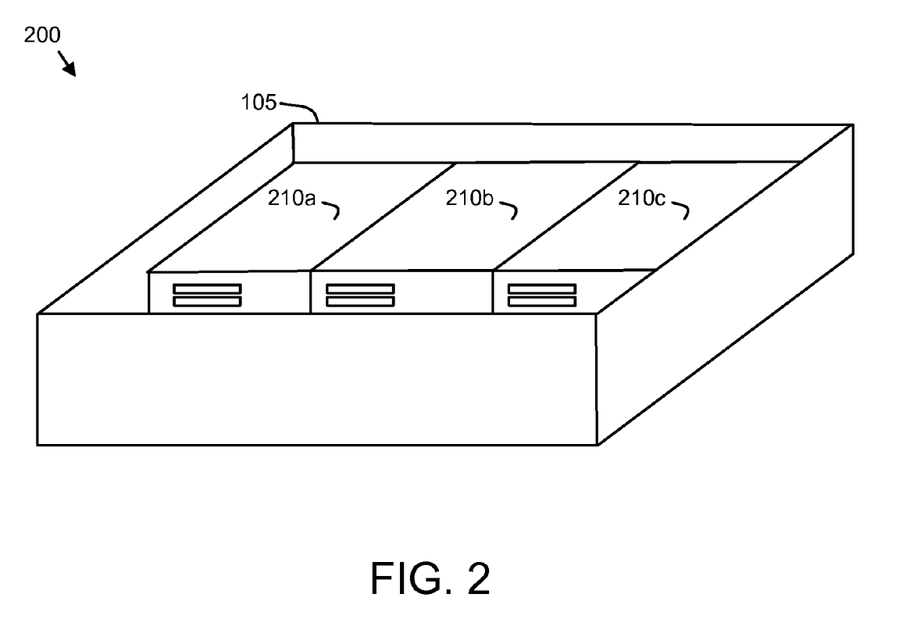
FIG. 2 is a schematic block diagram illustrating one embodiment of a tray with tray devices of the present invention.

FIG. 2 is a schematic block diagram illustrating one embodiment of a tray with tray devices 200 of the present invention. The description of the tray with tray devices 200 refers to elements of FIG. 1, like numbers referring to like elements. The tray with tray devices 200 includes the enclosure 105 and a plurality of tray devices 210. Although, for simplicity only three (3) tray devices 210 are shown, any number of tray devices 210 may be used.

The tray devices 210 may be hard disk drives, processors, and the like. The tray devices 210 may be mounted within the enclosure 105 at slots defined by the tray connectors 110. For example, the first tray device 210a may be a hard disk drive connected to the first tray connector 110a, the second tray device 210b may be a processor connected to the second tray connector 110b, and the third tray device 210c may be another hard disk drive connected to the third connector 110c.

Figure 3:
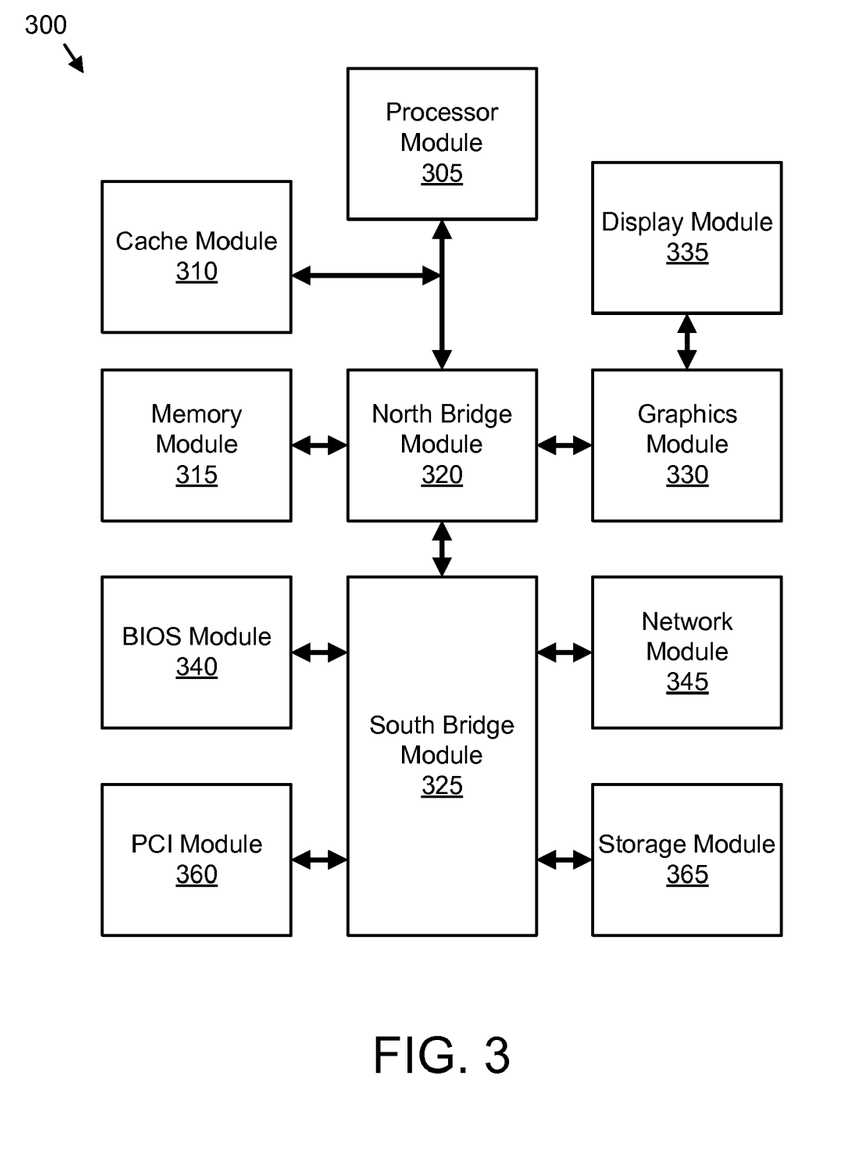
FIG. 3 is a schematic block diagram illustrating one embodiment of a computer of the present invention.

FIG. 3 is a schematic block diagram illustrating one embodiment of a computer 300 of the present invention. The description of the computer 300 refers to elements of FIGS. 1-2, like numbers referring to like elements. The computer 300 includes a processor module 305, a cache module 310, a memory module 315, a north bridge module 320, a south bridge module 325, a graphics module 330, a display module 335, a basic input/output system ("BIOS") module 340, a network module 345, a peripheral component interconnect ("PCI") module 360, and a storage module 365. The computer 200 may be in communication with the tray 100.

The processor module 305, cache module 310, memory module 315, north bridge module 320, south bridge module 325, graphics module 330, display module 335, BIOS module 340, network module 345, PCI module 360, and storage module 365, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 315 stores software instructions and data. The processor module 305 executes the software instructions and manipulates the data as is well know to those skilled in the art. The software instructions and data may be configured as one or more computer readable programs. The computer readable programs may be tangibly stored in the storage module 365. The storage module 365 may be a hard disk drive, an optical storage device, a holographic storage device, a micromechanical storage device, a semiconductor storage device, or the like.

The processor module 305 may communicate with the cache module 310 through a processor interface bus to reduce the average time to access memory module 315. The cache module 310 may store copies of the data from the most frequently used memory module 315 locations. The computer 300 may use one or more cache module 310 such as a DDR2 cache memory or the like.

The north bridge module 320 may communicate and hence may provide bridging functionality between the processor module 305, the graphic module 330, the memory module 315, and the cache module 310. The processor module 305 may be connected to the north bridge module 320 over a, for example, six hundred sixty seven Megahertz (667 MHz) front side bus.

The north bridge module 320 may be connected to the south bridge module 325 through a direct media interface (DMI) bus. The DMI bus may provide a high-speed, bi-directional, point-to-point link supporting a clock rate for example one Gigabytes per second (1 GBps) in each direction between the north bridge module 320 and the south bridge module 325. The south bridge module 325 may support and communicate with the BIOS module 340, the network module 345, the PCI module 360, and the storage module 365.

The PCI module 360 may communicate with the south bridge module 325 for transferring data or power to peripheral devices. The PCI module 360 may include a PCI bus for attaching the peripheral devices. The PCI bus can logically connect several peripheral devices over the same set of connections. The peripherals may be selected from a printer, a joystick, a scanner, or the like. The PCI module 360 may also be an expansion card as is well known to those skilled in the art.

The BIOS module 340 may communicate instructions through the south bridge module 325 to boot the computer 300, so that software instructions stored on the storage module 365 can load, execute, and assume control of the computer 300. Alternatively, the BIOS module 340 may comprise a coded program embedded on a chipset that recognises and controls various devices that make up the computer 300.

The network module 345 may communicate with the south bridge module 325 to allow the computer 300 to communicate with other devices over a network. The devices may include routers, bridges, computers, printers, and the like.

The display module 335 may communicate with the graphic module 330 to display the topological display of the user interface elements as will be described hereafter. The display module 335 may be a cathode ray tube (CRT), a liquid crystal display (LCD) monitor, or the like.

Figure 4:
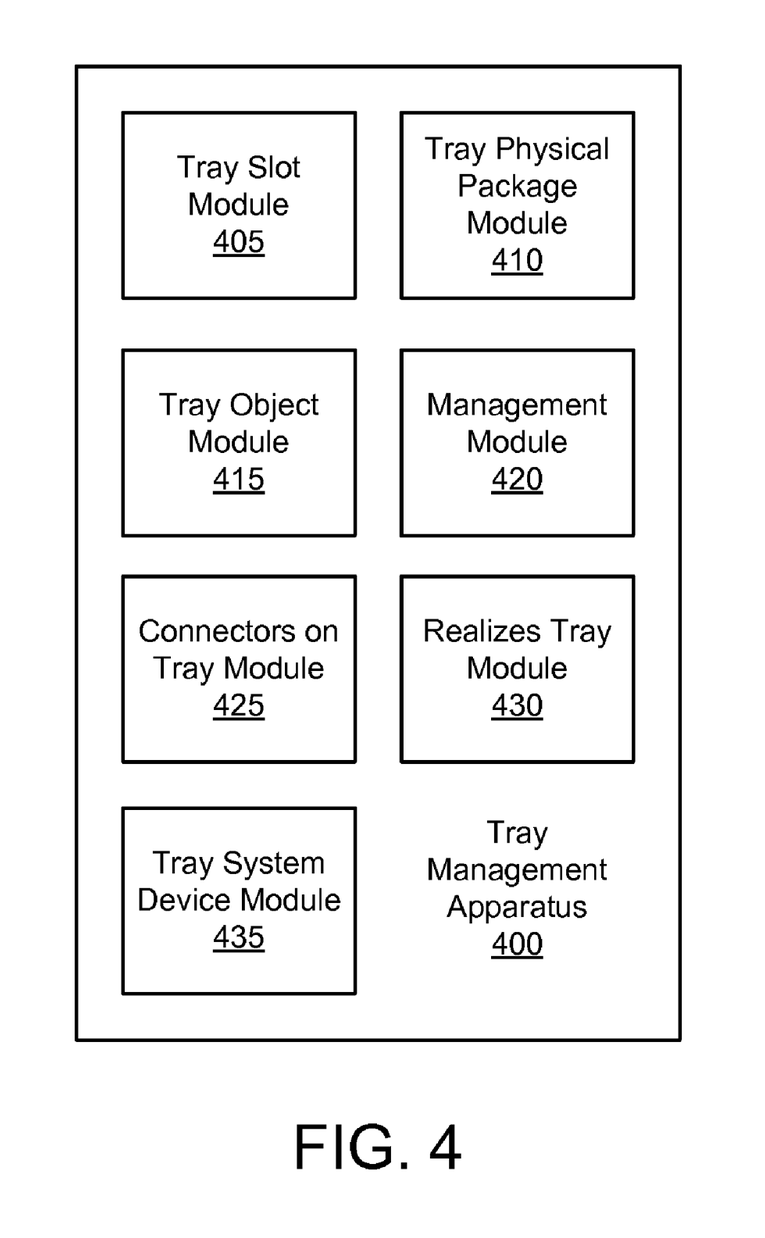
FIG. 4 is a schematic block diagram illustrating one embodiment of a tray management apparatus of the present invention.

FIG. 4 is a schematic block diagram illustrating one embodiment of a tray management apparatus 400 of the present invention. The computer 300 of FIG. 3 may embody the apparatus 400. The description of the apparatus 400 refers to elements of FIGS. 1-3, like numbers referring to like elements. The apparatus 400 includes a tray slot module 405, a tray physical package module 410, a tray object module 415, and a management module 420. The apparatus may further include a connectors on tray module 425, a realizes tray module 430, and a tray system device module 435. The tray slot module 405, tray physical package module 410, tray object module 415, management module 420, connectors on tray module 425, realizes tray module 430, and tray system device module 435 may be configured as computer readable programs executing on the processor module 305.

The tray slot module 405 creates a tray slot object of a tray slot class. The tray slot class extends a SMI-S CIM CIM_Slot class. The tray slot object describes a tray slot and comprises a slot number.

The tray physical package module 410 creates a tray physical package object of a tray physical package class. The tray physical package class extends a SIM-S CIM CIM_PhysicalPackage class. The tray physical package object describes a tray device 210. In addition, the tray physical package object references the tray slot object and comprises a universal unique identifier. In an embodiment, the tray device 210 is a storage device. The storage device may be a hard disk drive. In another embodiment, the hard disk drive is hot swappable.

The tray object module creates 415 a tray object of a tray class. The tray class extends a SMI-S CIM CIM_LogicalDevice class. The tray object of a tray class describes a tray. In addition, the tray object of the tray class is referenced by a SMI-S CIM CIM_ComputerSystem object, references the tray physical package object, and comprises a device identifier.

Further, the connectors on tray module 425 may create a connectors on tray object of a connectors on tray class that may describe the tray connectors 110. The tray physical package object may reference the connectors on tray object.

In an embodiment, the realizes tray module 430 creates a realizes tray object of a realizes tray class. The realizes tray object may associate the tray object and the tray physical package object.

Further, the tray system device module 435 may create a tray system device object of a tray system device class that describes a tray system, such as a tray, connectors, and tray devices. The SMI-S CIM CIM_ComputerSystem object may reference the tray system device object.

The management module 420 manages the device trays 100 using the tray slot object, tray physical package object, and tray object. The tray slot object, tray physical package object, and tray object may be defined using a Managed Object Format (MOF) language. For example, each tray slot object, tray physical package object, and tray object may be stored in the memory module 315 and/or storage module 365. The management module 320 may manage the device trays 100 using the tray slot object, the tray physical package object, the tray object, the connectors on tray object, the realize tray object, the tray system device object, and the tray object as will be described hereafter.

Figure 5:
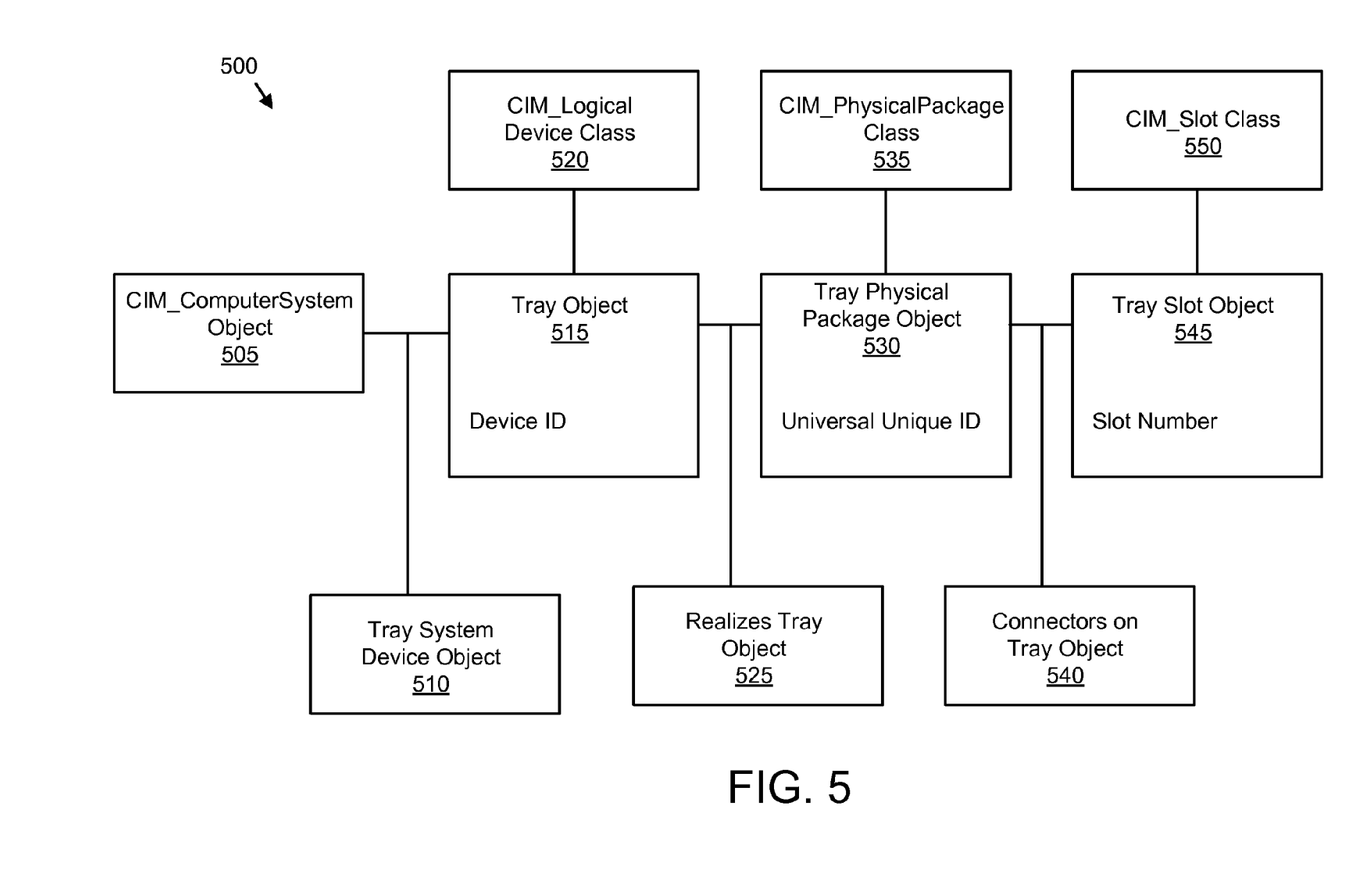
FIG. 5 is a schematic block diagram illustrating one embodiment of objects of the present invention.

FIG. 5 is a schematic block diagram illustrating one embodiment of objects 500 of the present invention. The management module 420 employs the objects 500 to manage the tray device 210. The objects 500 include a CIM_ComputerSystem object 505, a tray object 515, a tray physical package object 530, and a tray slot object 545. The objects 500 may further include a tray system device object 510, a realizes tray object 525, and a connectors on tray object 540. The description of the objects 500 refers to elements of FIGS. 1-4, like numbers referring to like elements.

The tray slot object 545 is created from the tray slot class that extends the SMI-S CIM CIM_Slot class 550. For example, the slot object 545 may import the CIM_Slot class 550 as illustrated by initial lines of source code for creating the slot object 545 in Table 1.

TABLE 1 import CIM_Slot class.*;
class trayslot {

Thus the tray slot object 545 may include all of the elements of the CIM_Slot class 550. The tray slot object 545 includes a slot number. The slot number may be stored as values in data fields of the memory module 315 and/or storage module 365. The tray slot may be a number with a fixed length such as a twenty-four (24) digit number.

The tray physical package object 530 is created from the tray physical package class that extends the SMI-S CIM CIM_PhysicalPackage class 535. For example, the tray physical package object 530 may import the CIM_PhysicalPackage class 535 as illustrated by initial lines of source code for creating the tray physical package object 530 in Table 2.

TABLE 2 import CIM_PhysicalPackage class.*;
class tray physical package {

Thus the tray physical package object 530 may include all of the elements of the CIM_PhysicalPackage class 535. The tray physical package slot object 530 includes a universal unique identifier. The universal unique identifier may be stored as values in data fields of the memory module 315 and/or storage module 365. The universal unique identifier may be a number with a fixed length such as a ten (10) digit number, a word such as "HDD" or "PENTIUM", or the like.

The tray object 515 is created from the tray class that extends the SMI-S CIM CIM_LogicalDevice class 520. For example, the tray object 515 may import the CIM_LogicalDevice class 520 as illustrated by initial lines of source code for creating the tray object 515 in Table 3.

TABLE 3 import CIM_LogicalDevice.*;
object logical device {

Thus the tray object 515 may include all of the elements of the CIM_LogicalDevice class 520. The tray object 515 includes a device identifier. The device identifier may be stored as values in data fields of the memory module 315 and/or storage module 365. The device identifier may be a number with a fixed length such as a five (5) digit number, a word such as "HDD" or "PENTIUM", a combination of a number and a word such as "IBM2530", a sign, or the like.

The connectors on tray object 540 is created from a tray class as is well known to those of skill in the art. The tray physical package object 530 may reference the connectors on tray object 540. Also, the connectors on tray object 540 creates an association between the tray physical object 530 and the tray slot object 545.

The realizes tray object 525 is created from a realizes tray class as is well known to those of skill in the art. The realizes tray object 525 may create association between the tray object 515 and the tray physical package object 530. The tray system device object 510 is created from a tray system device class as is well known to those of skill in the art. The SMI-S CIM CIM_ComputerSystem object 505 may reference the tray system device object 510. The tray system device object 510 may create association between the SMI-S CIM CIM_ComputerSystem object 505 and the tray object 515.

In one embodiment, the tray slot object 545, the tray physical package object 530, and the tray object 515 are defined using a Managed Object Format (MOF) language. MOF may be based on an Interface Definition Language (IDL). MOF may define object definitions in textual form, establishing a syntax for writing definitions.

The schematic flow chart diagram that follows is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
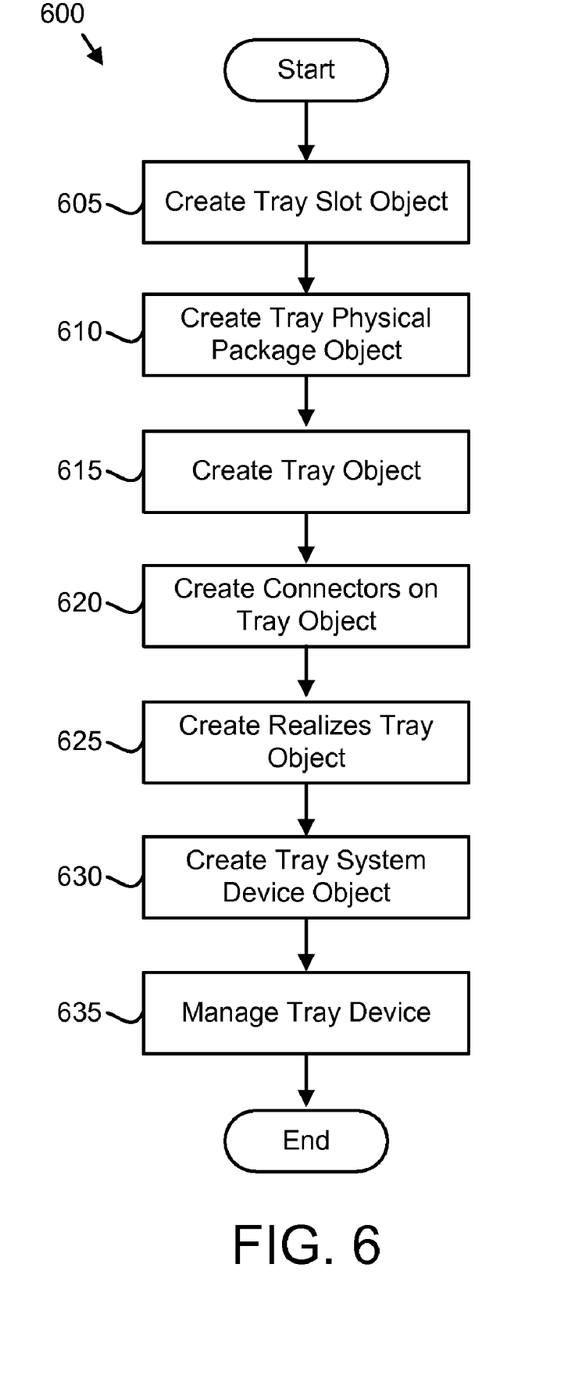
FIG. 6 is a schematic flow chart diagram illustrating one embodiment of a method for managing a tray device of the present invention.

FIG. 6 is a schematic flow chart diagram illustrating one embodiment of a method 600 for managing tray devices 210 of the present invention. The method 600 substantially includes the steps to carry out the functions presented above with respect to the operation of the described apparatus and system of FIGS. 1-5. In one embodiment, the method 600 is implemented with a computer program product comprising a computer readable medium having a computer readable program. The computer readable program may be integrated into a computing system, such as the computer 300, wherein the program in combination with the computing system is capable of performing the method 600.

The method 600 starts and in one embodiment, the tray slot module 405 creates 605 the tray slot object 545 of the tray slot class. In one embodiment, the tray slot module 405 creates 605 the tray slot object 545 by allocating a specified portion of memory in the memory module 315 and/or the storage module 365 for the tray slot object 545. The tray slot module 405 may further create a tray slot pointer to the specified portion of memory and communicate the tray slot pointer to one or more computer readable programs. The tray slot class extends the CIM CIM_Slot class 550. The tray slot object 545 describes the tray slot and comprises the slot number.

The tray physical package module 410 creates 610 the tray physical package object 530 of the tray physical package class. In one embodiment, the tray physical package module 410 creates 610 the tray physical package object 530 by allocating a specified portion of the memory in the memory module 315 and/or the storage module 365 for the tray physical package object 530. The tray physical package module 410 may further create a tray physical package pointer to the specified portion of the memory and communicate the tray physical package pointer to one or more computer readable programs. The tray physical package class extends the CIM CIM_PhysicalPackage class 535. In addition, the tray physical package object 530 describes the tray device 210. The tray physical package object 530 references the tray slot object 545 and comprises the universal unique identifier.

The tray object module 415 creates 615 the tray object 515 of the tray class. In one embodiment, the tray object module 415 creates 615 the tray object 515 by allocating the specified portion of the memory in the memory module 315 and/or the storage module 365 for the tray object 510. The tray object module 415 may further create a tray pointer to the specified portion of the memory and communicate the tray pointer to one or more computer readable programs. The tray class extends CIM CIM_LogicalDevice class 520. The tray object 515 describes a tray 100. The tray object 515 is referenced by the SMI-S CIM CIM_ComputerSystem object 505, references the tray physical package object 530, and comprises the device identifier.

Further, the connectors on tray module 425 may create 620 the connectors on tray object 540 of the connectors on tray class. In one embodiment, the connectors on tray module 425 creates 620 the connectors on tray object 540 by allocating a specified portion of the memory in the memory module 315 and/or the storage module 365 for the connectors on tray object 540. The connectors on tray module 425 may further create a connectors on tray pointer to the specified portion of the memory and communicate the connectors on tray pointer to one or more computer readable programs. In an embodiment, the tray class describes the connectors 110. The tray physical package object 530 may reference the connectors on tray object 515.

In an embodiment, the realizes tray module 430 further creates 625 the realizes tray object 525 of the realizes tray class. The realizes tray module 430 may create 625 the realizes tray object 525 by allocating a specified portion of the memory in the memory module 315 and/or the storage module 365 for the realizes tray object 525. The realizes tray module 430 may further create a realizes tray pointer to the specified portion of the memory and communicate the realizes on tray pointer to one or more computer readable programs. In an embodiment, the realizes tray object 525 associates the tray object 515 and the tray physical package object 530.

Further, the tray system device module 435 may create 630 the tray system device object 510 of the tray system device class. In one embodiment, the tray system device module 435 creates 630 the tray system device object 510 by allocating a specified portion of the memory in the memory module 315 and/or the storage module 365 for the tray system device object 510. The tray system device module 435 may further create a tray system device pointer to the specified portion of the memory and communicate the tray system device pointer to one or more computer readable programs. The tray system device class may describe a tray system, such as the tray 100, connectors, and tray devices 210. The SMI-S CIM CIM_ComputerSystem object 505 may reference the tray system device object 510.

The management module 420 may manage 635 the device trays 100 using the tray slot object 545, the connectors on tray object 540, the tray physical package object 530, the realize tray object 525, the tray system device object 510, and the tray object 515 and the method 500 ends. For example, the management module 420 may detect a tray device 210 connected to a connector 110, logically connect the tray device 210, initialize the tray device 210, activate the tray device 210, quiesce the tray device 210, power down the tray device 210, and the like using the tray slot object 545, the connectors on tray object 540, the tray physical package object 530, the realize tray object 525, the tray system device object 510, and the tray object 515.

Thus the method 600 manages 635 tray devices 210 for a data processing system using the objects 500, allowing the management of a tray device 210 under SMI-S. The present invention supports and extends CIM so that tray devices 210 may be consistently managed in heterogeneous environment.

The present invention creates objects 500 for managing device trays. The objects 500 are of classes that extend SMI-S CIM classes. The present invention manages 635 tray devices 210 using the objects 500. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to manage a tray device, the apparatus comprising:
 a memory storing a computer readable program;
 a processor executing the computer readable program, the computer readable program comprising:
  a tray slot module configured to create a tray slot object of a tray slot class that extends a Storage Management Initiative specification (SMI-S) Common Information Model (CIM) CIM_Slot class, wherein the tray slot object describes a tray slot and comprises a slot number;

a tray physical package module configured to create a tray physical package object of a tray physical package class that extends a SIM-S CIM CIM_PhysicalPackage class, wherein the tray physical package object describes a tray device, references the tray slot object, and comprises a universal unique identifier;

a tray object module configured to create a tray object of a tray class that extends a SMI-S CIM CIM_LogicalDevice class, wherein the tray object describes a tray, is referenced by a SMI-S CIM CIM_ComputerSystem object, references the tray physical package object, and comprises a device identifier; and a management module configured to manage the tray device using the tray slot object, tray physical package object, and tray object.

2. The apparatus of claim 1, the computer readable program further comprising a connectors on tray module configured to create a connectors on tray object of a connectors on tray class, wherein the tray physical package object describes tray connectors and references the connectors on tray object.

3. The apparatus of claim 1, the computer readable program further comprising a realizes tray module configured to create a realizes tray object of a realizes tray class, wherein the realizes tray object associates the tray object and the tray physical package object.

4. The apparatus of claim 1, the computer readable program further comprising a tray system device module configured to create a tray system device object of a tray system device class that describes a tray system, wherein the SMI-S CIM CIM_ComputerSystem object references the tray system device object.

5. The apparatus of claim 1, wherein the tray slot object, tray physical package object, and tray object are defined using a Managed Object Format (MOF) language.

6. A computer program product comprising a memory storing a computer readable program, wherein the computer readable program when executed on a computer causes the computer to:

create a tray slot object of a tray slot class that extends a SMI-S CIM CIM_Slot class, wherein the tray slot object describes a tray slot and comprises a slot number;

create a tray physical package object of a tray physical package class that extends a SIM-S CIM CIM_PhysicalPackage class, wherein the tray physical package object describes a tray device, references the tray slot object, and comprises a universal unique identifier;

create a tray object of a tray class that extends a SMI-S CIM CIM_LogicalDevice class, wherein the tray object describes a tray, is referenced by a SMI-S CIM CIM_ComputerSystem object, references the tray physical package object, and comprises a device identifier; and manage the tray device using the tray slot object, tray physical package object, and tray object.

7. The computer program product of claim 6, wherein the computer readable program is further configured to cause the computer to create a connectors on tray object of a connectors on tray class, wherein the tray physical package object describes tray connectors and references the connectors on tray object.

8. The computer program product of claim 6, wherein the computer readable program is further configured to cause the computer to create a realizes tray object of a realizes tray class, wherein the realizes tray object associates the tray object and the tray physical package object.

9. The computer program product of claim 6, wherein the computer readable program is further configured to cause the computer to create a tray system device object of a tray system device class that describes a tray system, wherein the SMI-S CIM CIM_ComputerSystem object references the tray system device object.

10. The computer program product of claim 6, wherein the tray slot object, tray physical package object, and tray object are defined using a MOF language.

11. The computer program product of claim 6, wherein the tray device is a storage device.

12. The computer program product of claim 6, wherein the storage device is a hard disk drive.

13. A system to manage a tray device, the system comprising:

a tray configured to receive a storage device;

a computer comprising a processor and a memory configured to execute computer readable programs comprising a tray slot module configured to create a tray slot object of a tray slot class that extends a SMI-S Common CIM CIM_Slot class, wherein the tray slot object describes a tray slot and comprises a slot number;

a tray physical package module configured to create a tray physical package object of a tray physical package class that extends a SIM-S CIM CIM_PhysicalPackage class, wherein the tray physical package object describes the storage device, references the tray slot object, and comprises a universal unique identifier;

a tray object module configured to create a tray object of a tray class that extends a SMI-S CIM CIM_LogicalDevice class, wherein the tray object describes the tray, is referenced by a SMI-S CIM CIM_ComputerSystem object, references the tray physical package object, and comprises a device identifier; and a management module configured to manage the storage device using the tray slot object, tray physical package object, and tray object.

14. The system of claim 13, the computer readable programs further comprising a connectors on tray module configured to create a connectors on tray object of a connectors on tray class, wherein the tray physical package object describes tray connectors and references the connectors on tray object.

15. The system of claim 13, the computer readable programs further comprising a realizes tray module configured to create a realizes tray object of a realizes tray class, wherein the realizes tray object associates the tray object and the tray physical package object.

16. The system of claim 13, the computer readable programs further comprising a tray system device module configured to create a tray system device object of a tray system device class that describes a tray system, wherein the SMI-S CIM CIM_ComputerSystem object references the tray system device object.

17. The system of claim 13, wherein the tray slot object, tray physical package object, and tray object are defined using a MOF language.

18. The system of claim 13, wherein the storage device is a hard disk drive.

19. The system of claim 18, wherein the hard disk drive is hot swappable.

20. A method for deploying computer infrastructure, comprising integrating a computer readable program into a computing system, wherein the computer readable program executed by the computing system performs the following:

creating a tray slot object of a tray slot class that extends a SMI-S CIM CIM_Slot class, wherein the tray slot object describes a tray slot and comprises a slot number;

creating a tray physical package object of a tray physical package class that extends a SIM-S CIM CIM_PhysicalPackage class, wherein the tray physical package object describes a tray device, references the tray slot object, and comprises a universal unique identifier;

creating a tray object of a tray class that extends a SMI-S CIM CIM_LogicalDevice object, wherein the tray object describes a tray, is referenced by a SMI-S CIM CIM_ComputerSystem class, references the tray physical package object, and comprises a device identifier;

creating a connectors on tray object of a connectors on tray class, wherein the tray physical package object describes tray connectors and references the connectors on tray object;

creating a realizes tray object of a realizes tray class, wherein the realizes tray object associates the tray object and the tray physical package object;

creating a tray system device object of a tray system device class that describes a tray system, wherein the SMI-S CIM CIM_ComputerSystem object references the tray system device object; and managing the tray device using the tray slot object, tray physical package object, tray object, connectors on tray object, realizes tray object, and tray system device object.

* * * * *